(12) United States Patent
Daveau et al.

(10) Patent No.: US 12,381,020 B2
(45) Date of Patent: Aug. 5, 2025

(54) METHOD FOR MANUFACTURING A FIRE-RESISTANT AND/OR FIRE-RETARDANT CABLE

(71) Applicant: NEXANS, Courbevoie (FR)

(72) Inventors: Sylvie Daveau, Irigny (FR); Thierry Auvray, Lyons (FR); Franck Gyppaz, Lyons (FR)

(73) Assignee: NEXANS, Courbevoie (FR)

( * ) Notice: Subject to any disclaimer, the term of this patent is extended or adjusted under 35 U.S.C. 154(b) by 881 days.

(21) Appl. No.: 17/552,947

(22) Filed: Dec. 16, 2021

(65) Prior Publication Data

US 2022/0251312 A1 Aug. 11, 2022

(30) Foreign Application Priority Data

Dec. 17, 2020 (FR) .................................... 20 13453

(51) Int. Cl.
*H01B 13/32* (2006.01)
*C04B 28/00* (2006.01)
*C08J 5/04* (2006.01)
*H01B 9/02* (2006.01)

(52) U.S. Cl.
CPC ........... *H01B 13/32* (2013.01); *C04B 28/006* (2013.01); *C08J 5/046* (2013.01); *H01B 9/025* (2013.01)

(58) Field of Classification Search
CPC ........ H01B 13/32; H01B 9/025; H01B 13/06; H01B 3/14; H01B 3/48; H01B 7/295; C04B 28/006; C08J 5/046; Y02P 40/10; Y02W 30/91
See application file for complete search history.

(56) References Cited

U.S. PATENT DOCUMENTS

| | | | |
|---|---|---|---|
| 2013/0130886 A1* | 5/2013 | Davidovics | C04B 41/009 65/33.1 |
| 2017/0345528 A1* | 11/2017 | Gyppaz | C04B 28/006 |
| 2019/0152849 A1* | 5/2019 | Scurgai | B05D 1/18 |

FOREIGN PATENT DOCUMENTS

| | | |
|---|---|---|
| EP | 3474293 | 4/2019 |
| EP | 3670471 | 6/2020 |
| WO | 2016/092200 | 6/2016 |
| WO | 2017/098114 | 6/2017 |

* cited by examiner

*Primary Examiner* — Doris L Lee
(74) *Attorney, Agent, or Firm* — MUNCY, GEISSLER, OLDS & LOWE, P.C.

(57) ABSTRACT

The present invention relates to a method for manufacturing a cable comprising at least one elongated electrically conducting element and at least one composite layer surrounding said elongated electrically conducting element, said composite layer being obtained from a roll of non-woven fibrous material impregnated with a geopolymer composition.

19 Claims, 1 Drawing Sheet

METHOD FOR MANUFACTURING A FIRE-RESISTANT AND/OR FIRE-RETARDANT CABLE

RELATED APPLICATION

This application claims the benefit of priority French Patent Application No. 20 13453 filed on Dec. 17, 2020, the entirety of which are incorporated by reference.

FIELD OF THE INVENTION

The present invention relates to a method for manufacturing a cable comprising at least one elongated electrically conducting element and at least one composite layer surrounding said elongated electrically conducting element, said composite layer being obtained by impregnating a non-woven fibrous material with a geopolymer composition.

The invention is applied typically, but not exclusively, to fire-retardant and/or fire-resistant cables which are intended for power transmission and/or data transmission, such as fire-retardant and/or fire-resistant, especially halogen-free, electrical cables and/or safety optical cables, which are able to operate for a given length of time under fire conditions but without either propagating the fire or generating large amounts of smoke. These safety cables are more particularly medium-voltage power transmission cables (especially from 6 to 45-60 kV) or low-frequency transmission cables, such as control or signalling cables.

DESCRIPTION OF RELATED ART

WO 2016/099200 discloses a method for manufacturing a fire-resistant cable that comprises the following steps: a step of preparation of a geopolymer composition comprising a sodium silicate, water, potassium hydroxide, an aluminosilicate, and polypropylene fibres; a step of winding a non-woven paper tape around an assembly of copper conductors; a step of impregnation of the copper conductors/non-woven paper tape assembly by dip coating in the previously prepared geopolymer composition, to form a composite layer surrounding the copper conductors; and then a step of hot extrusion of a protective polymer sheath. The method is lengthy, owing especially to the drying step, and cannot be performed continuously. Moreover, the constituent elements of the cable close to the composite layer based on a geopolymer material can easily be contaminated by the geopolymer composition.

OBJECTS AND SUMMARY

It is an aim of the invention to overcome some or all of the aforesaid drawbacks, and to provide a method for manufacturing a fire-retardant cable, said method being easy to implement and, in particular, being readily industrializable, economical and rapid, and permitting a cable to be obtained that exhibits good mechanical properties, particularly in terms of flexibility and durability.

According to a first aspect, the invention provides a method for manufacturing a cable comprising at least one elongated electrically conducting element and at least one composite layer surrounding said elongated electrically conducting element, characterized in that the composite layer surrounding said elongated electrically conducting element is formed by applying a tape of fibrous material impregnated with geopolymer composition around said cable comprising at least one elongated electrically conducting element, wherein said impregnated tape is delivered from a roll (more typically denoted "bobbin" or "spool") prepared (in situ or otherwise) by steps as follows:

i) impregnating a tape of non-woven fibrous material with a geopolymer composition, to form a tape impregnated with said geopolymer composition, ii) heat-treating the impregnated tape obtained in step i), to form an impregnated and partially dried tape, iii) forming the roll by winding the impregnated and partially dried tape from step ii) on itself.

The method of the invention thus comprises a step of applying the tape, delivered from the roll, around the cable comprising at least one elongated electrically conducting element. This step of applying the tape from the roll around the cable will be designated hereinafter as "step iv".

According to another aspect, the invention provides a roll of impregnated and partially dried tape which can be used in the method of the invention, and which may be obtained by the aforesaid steps i) to iii). This roll comprises a fibrous material tape impregnated with a heat-treated geopolymer composition and partially dried, said impregnated and partially dried tape being wound on itself about an axis perpendicular to its longitudinal axis.

Step ii) is a heat treatment which gives rise to gradual solidification by formation ("setting") of a geopolymer from the composition impregnating the tape. This treatment is conducted such that this solidification is only partial, thereby producing a viscosification of the impregnated composition and the conversion thereof into a pasty composition which nevertheless retains a certain pliability on the tape, to allow it to be unwound and handled in step iv).

In the present description, for purposes of brevity, the step ii) of heat treatment is sometimes denoted by "drying" step and, similarly, the tape obtained will be described as an impregnated and "partially dried" tape, despite the fact that step ii) employs processes more complex than a simple drying and leads more to formation of the geopolymer than to removal of water. In other words, the concept of "partial drying" of the impregnated tape refers more to a solely partial "setting" of the geopolymer composition.

In practice, in order to prevent development of the setting of the geopolymer composition between step iii) and step iv), it is possible advantageously to protect the tape in a sealed enclosure between steps iii) and iv). The roll of impregnated and partially dried tape according to the invention is typically supplied in a sealed enclosure of this type, packaged for example in an impervious container, for example a hermetically sealed plastic bag.

In the sense of the present description, the term "tape" denotes a deformable strip which, when placed flat, has substantially the geometry of a squashed and greatly elongated parallelepiped—that is, having a thickness much lower than its width (typically by a factor of at least 10), and having a width which in turn is much lower than its length (typically by a factor of at least 100). The two opposite faces of the parallelepiped that have the largest dimensions are denoted "faces" of the strip or tape, as opposed to the other faces, which form the side "edges". A tape possesses a longitudinal axis of symmetry, which traverses the entire length of the tape and will be designated here as "the longitudinal axis" of the tape.

A strip said to be "wound on itself" here denotes a strip which is formed by winding about an axis in such a way that one of its faces comes to lie opposite its opposing face (typically by bringing the two faces into direct contact: in the context of the invention, according to specific embodiments, a non-stick film may be envisaged between the opposing faces, although the use of such a film is in general not desirable), this being carried out with an overlap of the two opposing surfaces of typically at least 90%, or even at least 95% and preferably at least 99%. In the roll which can be used according to the method of the invention, the winding of the tape on itself is carried out about an axis perpendicular to the longitudinal axis of the tape, specifically by winding the tape on itself in the direction of its length, thereby giving the resulting roll, typically, the shape substantially of a cylinder having a height according to the generatrix which is substantially equal to the width of the tape.

The winding of the tape in step iii) is preferably carried out by placing the opposing faces of the tape exactly opposite one another, so giving the roll the shape, finally, of a cylinder having a height according to the generatrix which is equal to the width of the tape; however, variations owing to winding imprecisions can be envisaged, and this may lead to a slightly greater height, which remains preferably less than 1.5 times the width of the tape.

The roll which can be used according to the invention usually takes the form of an assembly comprising a carrier around which the tape is circumposed. Where appropriate, this carrier serves as the winding axis for the roll. This carrier, when present, typically has a length which is greater than or equal to the width of the tape. The carrier may in particular be a rigid part (such as a core or a cylindrical drum) typically having the shape of a cylinder (preferably with a circular section, although other geometries may be envisaged, theoretically), the tape then being wound about the generatrix of this cylinder.

The method of the invention is rapid, easy to implement, particularly on an industrial scale, economical, and ensures that a fire-resistant and/or fire-retardant cable is obtained that exhibits good mechanical properties, particularly in terms of flexibility and durability. Moreover, with the method of the invention, it is possible to avoid the contamination of the constituent elements of the cable close to the composite layer by the geopolymer composition.

The specific use of a roll to deliver the impregnated and partially dried tape allows the method of the invention to be all the more easily implemented. This roll may be prepared ahead of step iv), possibly on a site different to that of step iv), and stored for substantial periods of time, and it has the advantage, moreover, that it can be transported over long distances as and when required (where appropriate, the roll is generally packaged in an impervious container).

The implementation of steps i) and ii) easily and rapidly produces an impregnated and partially dried tape in which the amount of geopolymer applied is homogeneous and controlled, thereby making it possible in particular for the tape to be wound easily and for the resulting winding to have a homogeneous geometry.

Various aspects and possible embodiments of the invention are described in more detail below.

The Non-Woven Fibrous Material

The non-woven fibrous material employed according to the invention, particularly in step i), and present in the roll obtained at the end of step iii), preferably has a pliable and flexible structure. It is preferable, moreover, for it to have good mechanical properties of tensile strength and tear resistance.

This non-woven fibrous material may in particular be selected from cellulosic materials, materials based on synthetic organic polymers, glass fibres, and a mixture thereof, and preferably from materials based on synthetic organic polymers.

The cellulosic materials may be selected from paper, more particularly blotting paper; non-woven materials manufactured from functionalized or unfunctionalized cellulose; and matrices having a cellular and/or fibrous structure which are manufactured from natural cellulose acetate fibres.

The materials based on synthetic organic polymers may be selected from polymer materials having a porous and/or fibrous matrix of polyolefin(s), more particularly those selected from propylene homo- and copolymers, ethylene homo- and copolymers, high-density polyethylenes (HDPE), aromatic polyamides (aramids), polyesters, and a mixture thereof.

According to one preferred embodiment of the invention, the non-woven fibrous material is a polyethylene terephthalate (PET).

The non-woven fibrous material preferably has a basis weight of from about 50 to 120 $g/cm^2$. This therefore provides a composite layer which is sufficiently flexible for it to be manipulated easily, and sufficiently robust to ensure mechanical properties that are compatible with the impregnation and drying method and, in combination with the geopolymer composition with which it is impregnated, to provide effective fire protection.

According to one preferred embodiment of the invention, the non-woven fibrous material represents from about 2% to 95% by weight, with particular preference from about 5% to 45% by weight, and more preferably still from about 10% to 35% by weight, relative to the total weight of the composite layer.

The Geopolymer Composition

The geopolymer composition used in step i) is preferably a liquid geopolymer composition.

The geopolymer composition employed in step ii) is preferably an aluminosilicate geopolymer composition.

The geopolymer composition of the invention is especially preferably a geopolymer composition comprising water, silicon (Si), aluminium (Al), oxygen (O), and at least one element selected from potassium (K), sodium (Na), lithium (Li), caesium (Cs), and calcium (Ca), and preferably selected from potassium (K) and sodium (Na).

The geopolymer composition may more particularly comprise at least one first aluminosilicate, at least one first alkali metal silicate, water, and optionally an alkaline base.

The First Aluminosilicate

The first aluminosilicate may be selected from the metakaolins (i.e. calcined kaolins), fly ash, blast furnace slag, swelling clays such as bentonite, calcined clays, any type of compound comprising aluminium and fumed silica, zeolites, and a mixture thereof.

Among these compounds, the metakaolins are preferred, especially those marketed by the company Imerys.

In the invention, the expression "metakaolin" denotes a calcined kaolin or a dehydroxylated aluminosilicate. It is preferably obtained by dehydration of a kaolin or a kaolinite.

The geopolymer composition may comprise from about 5% to 50% by weight of aluminosilicate, and preferably from about 10% to 35% by weight of aluminosilicate, relative to the total weight of the geopolymer composition.

The geopolymer composition may further comprise a second aluminosilicate different from the first aluminosilicate.

The geopolymer composition preferably comprises two calcined kaolins having different calcination temperatures.

According to an especially preferred embodiment of the invention, the geopolymer composition comprises a first metakaolin selected from kaolins calcined at a temperature $T_{c1}$ of at least about 650° C., and a second metakaolin selected from kaolins calcined at a temperature $T_{c2}$ such that $T_{c2}-T_{c1} \geq 100°$ C. approximately, at least one first alkali metal silicate, water, and optionally an alkaline base. The geopolymer composition may then exhibit improved mechanical properties, especially in terms of flexibility and durability, while guaranteeing good properties of reaction and resistance to fire.

According to one embodiment of the invention, the first metakaolin is a kaolin calcined at a temperature $T_{c1}$ of at least about 700° C., and preferably of at least about 725° C.

According to a preferred embodiment of the invention, the first metakaolin is a kaolin calcined at a temperature $T_{c1}$ of at most about 875° C., and preferably of at most about 825° C.

The first metakaolin may comprise at least about 20 mol %, and preferably at least about 30 mol % of aluminium oxide ($Al_2O_3$), relative to the total number of moles of the first metakaolin.

The first metakaolin may comprise at most about 60 mol %, and preferably at most about 50 mol % of aluminium oxide ($Al_2O_3$), relative to the total number of moles of the first metakaolin.

The first metakaolin may comprise at least about 35 mol %, and preferably at least about 45 mol % of silicon oxide ($SiO_2$), relative to the total number of moles of the first metakaolin.

The first metakaolin may comprise at most about 75 mol %, and preferably at most about 65 mol % of silicon oxide ($SiO_2$), relative to the total number of moles of the first metakaolin.

Examples of first metakaolin include the metakaolins sold by the company Imerys, especially that sold under the reference PoleStar® 450.

The first metakaolin may be selected from the kaolins calcined at $T_{c1}$ as defined in the invention, for at least about 1 min, preferably for at least about 10 min, especially preferably for a time from about 30 min to 8 h, and more especially preferably for a time from about 2 h to 6 h.

The second metakaolin is preferably selected from kaolins calcined at a temperature $T_{c2}$ such that $T_{c2}-T_{c1} \geq 150°$ C. approximately, especially preferably such that $T_{c2}-T_{c1} \geq 200°$ C. approximately, and more especially preferably such that $T_{c2}-T_{c1} \geq 250°$ C. approximately.

According to one embodiment of the invention, the second metakaolin is a kaolin calcined at a temperature $T_{c2}$ of at least about 800° C., preferably of at least about 850° C., and especially preferably of at least about 900° C.

According to a preferred embodiment of the invention, the second metakaolin is a kaolin calcined at a temperature $T_{c2}$ of at most about 1200° C., and preferably of at most about 1150° C.

The second metakaolin may comprise at least about 20 mol %, and preferably at least about 30 mol % of aluminium oxide ($Al_2O_3$), relative to the total number of moles of the second metakaolin.

The second metakaolin may comprise at most about 60 mol %, and preferably at most about 50 mol % of aluminium oxide ($Al_2O_3$), relative to the total number of moles of the second metakaolin.

The second metakaolin may comprise at least about 35 mol %, and preferably at least about 45 mol % of silicon oxide ($SiO_2$), relative to the total number of moles of the second metakaolin.

The second metakaolin may comprise at most about 75 mol %, and preferably at most about 65 mol % of silicon oxide ($SiO_2$), relative to the total number of moles of the second metakaolin.

Examples of the second metakaolin include the metakaolins sold by the company Imerys, especially that sold under the reference PoleStar® 200R.

The second metakaolin may be selected from the kaolins calcined at $T_{c2}$ as defined in the invention, for at least about 1 min, preferably for at least about 5 min, especially preferably for a time from about 10 min to 2 h, and more especially preferably for a time from about 15 min to 1 h.

The weight ratio [first metakaolin/second metakaolin] in the geopolymer composition ranges preferably from about 0.1 to 2, especially preferably from about 0.5 to 1.0, and more especially preferably is about 1.

The geopolymer composition may comprise from about 5% to 50% by weight, and preferably from about 10% to 35% by weight of first and second metakaolins, relative to the total weight of the geopolymer composition.

The First Alkali Metal Silicate

The first alkali metal silicate may be selected from sodium silicates, potassium silicates, and a mixture thereof.

The alkali metal silicates sold by the company Silmaco or by the company PQ Corporation are preferred. The first alkali metal silicate is preferably a sodium silicate.

The first alkali metal silicate may have a molar ratio $SiO_2/M_2O$ from about 1.1 to 35, preferably from about 1.3 to 10, and especially preferably from about 1.4 to 5, with M being a sodium or potassium atom, and preferably a sodium atom.

The geopolymer composition may comprise from about 5% to 60% by weight, and preferably from about 10% to 50% by weight of the first alkali metal silicate, relative to the total weight of the geopolymer composition.

The Second Alkali Metal Silicate

The geopolymer composition may further comprise a second alkali metal silicate different from the first alkali metal silicate.

The second alkali metal silicate may be selected from sodium silicates, potassium silicates, and a mixture thereof. The alkali metal silicates sold by the company Silmaco or by the company PQ Corporation are preferred. The second alkali metal silicate is preferably a sodium silicate.

The first and second alkali metal silicates may respectively have molar ratios $SiO_2/M_2O$ and $SiO_2/M'_2O$ such that M and M', which are identical, are selected from a sodium atom and a potassium atom, and preferably a sodium atom, and said ratios have different values, preferably values such that their difference is at least 0.3, especially preferably such that their difference is at least 0.5, and more especially preferably such that their difference is at least 1.0.

According to one embodiment of the invention, the geopolymer composition comprises:
  a first alkali metal silicate having a molar ratio $SiO_2/M_2O$ from about 1.5 to 2.6, and
  a second alkali metal silicate having a molar ratio $SiO_2/M'_2O$ greater than 2.6, preferably from about 2.8 to 4.5, and especially preferably from about 3.0 to 4.0, it being understood that M' is identical to M.

The geopolymer composition may comprise from about 10% to 60% by weight, and preferably from about 20% to 50% by weight of first and second alkali metal silicates, relative to the total weight of the geopolymer composition.

The weight ratio [first alkali metal silicate/second alkali metal silicate] in the geopolymer composition preferably ranges from 0.5 to 2.5, and especially preferably from 0.8 to 2.0.

The Alkaline Base

The alkaline base may be sodium hydroxide, or potassium hydroxide, and preferably sodium hydroxide.

The geopolymer composition may be free from alkaline base. This may thus improve manipulation of the geopolymer composition, in particular during preparation of a cable.

The solids/water weight ratio in said geopolymer composition determines the kinetics of solidification in steps i) to iii).

The geopolymer composition may comprise from about 35% to 80% by weight, and especially preferably from about 40% to 70% by weight, of solid materials (alkali metal silicate(s), aluminosilicate(s) and alkaline base), relative to the total weight of said geopolymer composition.

The geopolymer composition may further comprise one or more additives selected from:
- a dye,
- mineral fibres, notably selected from alumina fibres,
- an additive with a polymer structure, notably selected from polyolefin fibres such as polypropylene fibres, high-density polyethylene (HDPE), aramids, and technical glass fibres coated with silicone or with an organic polymer of polyethylene type; a styrene-butadiene copolymer (SBR); a styrene-butadiene-ethylene copolymer (EBS); derivatives of styrene-ethylene copolymers, especially those sold by Kraton such as a styrene-ethylene-butylene-styrene copolymer (SEBS), a styrene-butadiene-styrene copolymer (SBS), a styrene-isoprene-styrene copolymer (SIS), a styrene-propylene-ethylene copolymer (EPS) or a styrene-ethylene-propylene-styrene copolymer (SEPS); an ethylene/vinyl acetate copolymer (EVA), a polyorganosiloxane that has been crosslinked (e.g. by means of a peroxide); polyethylene optionally in powder form; lignosulfonates; cellulose acetate; other cellulose derivatives; a silicone oil of low viscosity (e.g. of the order of 12500 cPo); and a polyethylene oil,
- a caking accelerator compound, notably selected from aluminium sulfate, alums (e.g. aluminium-potassium double sulfate), calcium chloride, calcium sulfate, hydrated calcium sulfate, sodium aluminate, sodium carbonate, sodium chloride, sodium silicate, sodium sulfate, iron(III) chloride, and sodium lignosulfonates,
- a caking retardant, notably selected from ammonium, alkali metals, alkaline earth metals, borax, lignosulfonates and more particularly metal salts of calcium lignosulfonates, celluloses such as carboxymethyl hydroethyl cellulose, sulfoalkylated lignins such as for example sulfomethylated lignin, hydroxycarboxylic acids, copolymers of salts of 2-acrylamido-2-methyl-propanesulfonic acid and of acrylic acid or maleic acid, and saturated salts,
- an inert filler, notably selected from talc, micas, dehydrated clays, and calcium carbonate,
- a starch,
- a starch plasticizer, notably selected from a metal stearate, a polyethylene glycol, an ethylene glycol, a polyol such as glycerol, sorbitol, mannitol, maltitol, xylitol or an oligomer of one of these polyols, a sucrose such as glucose or fructose, a plasticizer containing amide groups, and any type of plasticizer based on modified polysaccharide(s),
- a cellulose derivative,
- an expanded carbon material such as an expanded graphite.

The dye is preferably a dye that is liquid at room temperature (i.e. at 18-25° C.).

The geopolymer composition may comprise from about 0.01% to 15% by weight of additive(s), and preferably from about 0.5% to 8% by weight of additive(s), relative to the total weight of the geopolymer composition.

Impregnation Step i)

Step i) may be carried out manually or with automation, and is preferably carried out with automation.

Step i) is preferably carried out by impregnation-coating, and especially preferably by pre-controlled coating.

Step i) may for example be carried out using a coating device such as a coating die.

Step i) may more particularly be implemented by passing the non-woven fibrous material through a coating device such as a coating die, said device being supplied with the geopolymer composition, in particular using supply means such as a pump, preferably equipped with means for regulating the rate of supply. This allows the desired amount of the geopolymer composition to be directly distributed homogeneously over all of the desired width of said material in order to obtain effective, sufficient and appropriate impregnation of the tape.

Step i) may more particularly be a coating step of the type known as "tensioned web die coating".

In a preferred embodiment of the invention, the impregnation step i) is carried out at a temperature of from about 15° C. to 90° C., and especially preferably from about 20° C. to 40° C.

Drying Step ii)

Step ii) implements the drying of the impregnated tape obtained in the preceding step i).

Step ii) may advantageously be carried out at a temperature of at most about 120° C. A temperature less than or equal to 120° C. may make it possible in particular to prevent the composition curing before it is shaped to a roll in step iii). The temperature at which ii) is conducted is, in this context, preferably less than or equal to 115° C. at most, or even less than or equal to 110° C. (in particular less than or equal to 107° C.).

Step ii), moreover, may advantageously be carried out at a temperature of at least about 50° C. This is because a temperature greater than or equal to 50° C. promotes rapid drying. If there is a wish to reduce the drying time further, step ii) may be conducted at a temperature of at least about 60° C., or even at least 70° C., for example at a temperature of greater than or equal to 80° C. (in particular greater than or equal to 90° C.).

Step ii) is preferably carried out at a temperature of from about 70 to 115° C., and especially preferably from about 90 to 107° C.

Step ii) allows the geopolymer composition to be brought from a liquid state to a semi-pasty state. The geopolymer composition at the end of step ii) typically comprises at least one phase in the form of an aluminosilicate gel.

Step ii) may for example be carried out using one or more ovens, in particular one or more infrared ovens.

Step iii) of Forming the Roll from the Tape

In step iii), the impregnated and partially dried tape as obtained at the end of step ii) is typically shaped to give a roll in which the tape is wound on itself about an axis perpendicular to its longitudinal axis.

The winding of the tape in step iii) is typically carried out by rotating the end of the tape (typically around a drum-like cylindrical component), so driving the remaining tape around the axis of rotation. It is preferable to maintain the tape under tension, preferably with a constant tension, so as in particular to optimize the winding thereof.

The linear velocity of the tape during winding in step iii) is advantageously constant; this constant linear velocity may be obtained, for example, by regulating the rotary speed using a servo-control system linked, for example, to a measurement of the linear velocity of the tape or a measurement of the tension of the tape.

It proves likewise advantageous to keep the faces of the tape parallel to the axis around which the tape is wound, so as to prevent the tape folding, sliding or even breaking. For this purpose, the tape may advantageously be guided between guide devices (rollers, return pulleys, for example, which maintain the parallel state).

When the roll of tape has been prepared in step iii), said roll may easily be stored or transported, and especially so when packaged in a hermetic bag or a similar impervious container which also makes it possible to prevent the geopolymer composition setting between steps iii) and iv).

The roll used in the method according to the invention is preferably prepared continuously. In other words, steps i) to iii) described above are preferably carried out continuously.

In the sense of the present description, the concept of a succession of steps carried out "continuously" signifies that said steps are carried out on a single production line, and/or without steps of resting or recovering. In other words, in the method according to the invention, there are not intermediate resting steps between the distribution of the non-woven fibrous material and the recovery/production of the roll at the end of step iii).

When steps i), ii) and iii) are conducted continuously, they are typically implemented concomitantly, by circulating the non-woven fibrous material on a production line from a reserve of fibrous material (delivered in the form of a tape from a distributor such as an unreeling device or unwinder) and finishing in a roll preparation zone, and where each portion of the fibrous material tape in circulation is first subjected to step i) in a first zone of the production line, and then subjected to step ii) in a second ne of the production line, before finally being shaped into a roll in the roll preparation zone.

Steps i), ii) and iii) may be implemented for the manufacture of a plurality of rolls of the invention in succession. In this case, steps i), ii) and iii) may be conducted continuously for the preparation of each roll, with a halt in the chain of production between each roll; however, a method without the production line being stopped may also be considered, by equipping the chain with an accumulator at the entry and exit points.

Step i) is preferably implemented by passing the non-woven fibrous material in tape form through a coating device supplied with the geopolymer composition at a flow rate D (in kg/min); the distributor delivers the non-woven fibrous material at a velocity V (in km/min), with a ratio D/V of typically from about 20 to 50 kg of geopolymer composition/km of non-woven fibrous material, and especially preferably from about 25 to 40 kg of geopolymer composition/km of non-woven fibrous material. The amount of geopolymer composition applied to the non-woven fibrous material may therefore be easily controlled by a pump.

The velocity V is preferably identical to the speed of travel of the cable.

The flow rate D may typically range from about 0.5 kg/min to 1.8 kg/min.

The velocity V may typically range from about 20 m/m in to 50 m/m in.

In step ii), the conversion from the liquid state to the pasty state requires a substantial amount of energy. The use of a plurality of ovens, more particularly successive ovens along the production line, allows the drying of the impregnated tape to be optimized (in terms of exposure time, velocity V and amount of energy delivered).

According to an especially preferred embodiment of the invention, the non-woven fibrous material passes through the coating device for implementing step i), then the impregnated tape obtained passes through one or more ovens, preferably through a plurality of ovens arranged in succession one after another for implementing step ii), then the partially dried impregnated tape is wound on itself according to step iii) to form a roll, which is typically stored and/or transported to another site for the implementation of step iv).

Step iv) of Applying the Tape Around the Cable

In step iv), the tape is delivered from the roll, which is unreeled for application of the tape thus unreeled around said cable comprising at least one elongated electrically conducting element. According to the invention, the application of the impregnated and partially dried tape around the cable is carried out typically by winding the tape around the cable.

This winding of the tape around the cable, with the general aim of covering the cable with the tape over the whole of the cable length, is carried out typically:

along the longitudinal axis of the cable, in other words with winding of the tape around the cable with the longitudinal axis of the tape parallel to the longitudinal axis of the cable, the tape then being folded back around the cable in the direction of its width (the tape then closes on the cable with in general little overlap of the faces of the tape one over another, typically with regions of overlap of from about 10% to 20%);

or else by helicoidal winding, namely with winding of the tape around the cable with the longitudinal axis of the tape being neither parallel with nor perpendicular to the longitudinal axis of the cable, the tape then forming a helix around the cable (the tape then coating the cable with, in general, little overlap of the faces of the tape from one turn of the helix to the next, typically with regions of overlap of from about 10% to 20%).

Winding is advantageously helicoidal in step iv).

Step iv) may be carried out manually or with automation, and preferably with automation.

When the tape is wound around the cable along the longitudinal axis of the cable, step iv) is advantageously implemented by passing the partially dried impregnated tape (unreeled from the roll) through a confining device or a tape-forming device, causing it to fold back around the cable in the direction of the cable width (this device is denoted below as a "trumpet"). The cable comprising at least one elongated electrically conducting element then also passes through the confining device during step i), which allows the partially dried impregnated tape to wind continuously around the elongated electrically conducting element, thereby making it easier to wind the impregnated tape longitudinally around the cable, and so to form said composite layer surrounding said elongated electrically conducting element.

When the tape is wound helicoidally around the cable, step iv) is advantageously implemented by winding the tape around the elongated electrically conducting element, with the longitudinal axis of the tape forming an angle of typically between 20° and 70° with the longitudinal axis of the cable, with the cable being driven in rotation and in translation to ensure the continuous winding of the tape in the form of a helix around the cable.

The Composite Layer

The composite layer is preferably an electrically insulating layer.

In the present invention, "electrically insulating layer" means a layer whose electrical conductivity may be at most $1 \cdot 10^{-9}$ S/m, and preferably at most $1 \cdot 10^{-10}$ S/m (siemens per metre) (at 25° C.).

The composite layer is preferably a fire-retardant and/or fire-resistant layer.

The composite layer preferably has a thickness of from about 0.2 to 3 mm, and especially preferably from about 0.5 to 1 mm.

When the thickness of the composite layer is less than 0.2 mm, the thermal protection of the cable obtained according to the method of the invention is not sufficient.

The composite layer of the invention is preferably a ribboned layer (i.e. in the form of a tape or a strip).

The composite layer preferably has a substantially constant thickness and constitutes in particular a continuous protective envelope.

The composite layer may more particularly comprise 2 to 3 superposed tapes.

The composite layer of the invention is preferably not porous.

The composite layer is preferably an inner layer of said cable.

According to the invention, "inner layer" means a layer that does not constitute the outermost layer of the cable.

The composite layer preferably comprises at least one geopolymer material and the non-woven fibrous material as defined in the invention.

The Geopolymer Material

In the present invention, the geopolymer material is obtained from a geopolymer composition as defined in the invention, preferably by curing, geopolymerization and/or polycondensation of said geopolymer composition.

In particular, the geopolymer composition as defined in the invention is able to form said geopolymer material. The ingredients of the geopolymer composition may therefore undergo polycondensation to form said geopolymer material. Curing takes place by internal reaction of the polycondensation type. Curing is not, for example, the result of simple drying, as is generally the case for binders based on alkali metal silicates.

In fact, the geopolymer materials result from a mineral polycondensation reaction by alkaline activation, called geosynthesis, in contrast to the conventional hydraulic binders in which curing is the result of hydration of calcium aluminates and calcium silicates.

In the present invention, the expression "geopolymer material" signifies a solid material comprising silicon (Si), aluminium (Al), oxygen (O) and at least one element selected from potassium (K), sodium (Na), lithium (Li), caesium (Cs) and calcium (Ca), and preferably selected from potassium (K) and sodium (Na).

The geopolymer material may be an aluminosilicate geopolymer material.

The aluminosilicate geopolymer material may be selected from the poly(sialates) corresponding to formula (I) $M_n(—Si—O—Al—O—)_n$ [(M)-PS] and having a molar ratio Si/Al equal to 1, the poly(sialate-siloxos) corresponding to formula (II) $M_n(-Si—O—Al—O—Si—O—)_n$ [(M)-PPS] and having a molar ratio Si/Al equal to 2, the poly(sialate-disiloxos) corresponding to formula (III) $M_n(-Si—O—Al—O—Si—O—Si—O)_n$ [(M)-PSDS] and having ratio Si/Al equal to 3, and other poly(sialates) with ratio Si/Al>3, the aforementioned poly(sialates) comprising an alkali metal cation M selected from K, Na, Li, Cs and a mixture thereof, and n denoting the degree of polymerization.

In one embodiment, the geopolymer material represents from about 5% to 98% by weight, preferably from about 55% to 95% by weight, and more preferably from about 65% to 90% by weight, relative to the total weight of the composite layer.

The method may further comprise, before step i), a step $i_0$) of preparing the geopolymer composition comprising the mixing of said first aluminosilicate with said first alkali metal silicate, water, and optionally the alkaline base.

Step $i_0$) is generally carried out at a high pH, notably in the range from 10 to 13.

Step $i_0$) preferably comprises the following substeps:
$i_{01}$) a substep of preparing an aqueous solution of the first alkali metal silicate, and
$i_{02}$) a substep of mixing the first aluminosilicate in the form of powder with the aqueous solution of alkali metal silicate prepared in the preceding substep $i_{01}$).

The aqueous solution of the first alkali metal silicate may be prepared by mixing silicon dioxide $SiO_2$ or an alkali metal silicate with a base MOH in which M is K or Na.

The silicon dioxide $SiO_2$ may be selected from fumed silica (i.e. pyrogenic silica), quartz, and mixtures thereof.

Substep $i_{01}$) may be carried out by dissolving the base in water, resulting in release of heat (exothermic reaction), and then adding the silica (or the alkali metal silicate). The heat released then accelerates dissolution of the silica (or the alkali metal silicate) in substep $i_{01}$), and of the first aluminosilicate in substep $i_{02}$).

When the second aluminosilicate and/or the second alkali metal silicate as defined in the invention is/are present, step $i_0$) of preparing the geopolymer composition may comprise mixing said first aluminosilicate and optionally said second aluminosilicate with said first alkali metal silicate, optionally said second alkali metal silicate, water, and optionally the alkaline base.

Step $i_0$) preferably comprises mixing the first and second metakaolins with the first alkali metal silicate and optionally the second alkali metal silicate, water, and optionally an alkaline base.

The first and second metakaolins and the first and second alkali metal silicates are as defined in the invention.

According to a preferred embodiment, step $i_0$) comprises the following substeps:
$i_{0a}$) mixing the first and second alkali metal silicates, notably with stirring,
$i_{0b}$) optionally adding an alkaline base, notably while maintaining stirring, and
$i_{0c}$) adding the first and second metakaolins, notably while maintaining stirring.

At the end of step $i_0$), or of substep $i_{02}$) or $i_{0c}$), a fluid, homogeneous solution is preferably obtained.

At the end of step $i_0$), the geopolymer composition may comprise from about 35% to 80% by weight, and especially preferably from about 40% to 70% by weight, of solids (alkali metal silicate(s), aluminosilicate(s) and alkaline base), relative to the total weight of said geopolymer composition.

This kind of weight ratio can provide a geopolymer composition that is sufficiently fluid to allow manipulation thereof, and with slow enough solidification kinetics to allow formation of a cable layer as defined hereinafter.

The solids/water weight ratio in said geopolymer composition may make it possible to determine the solidification kinetics of said geopolymer composition.

After step $i_0$) of preparing the geopolymer composition, and before the impregnation step i), the geopolymer composition may be heated, especially to a temperature from about 55° C. to 95° C., and especially preferably from about 70° C. to 90° C. This will thus facilitate step i).

The method may further comprise, after step iv), a step v) of applying an external protective sheath around the composite layer. The external protective sheath can ensure mechanical integrity of the cable.

At the end of step v), the cable may then comprise at least one elongated electrically conducting element, the composite layer surrounding said elongated electrically conducting element, and at least one external protective sheath surrounding said composite layer.

Step v) is preferably carried out by extrusion, especially at a temperature from about 140° C. to 195° C.

Step v) may for example be carried out using an extruder.

In this embodiment, an extrusion head may be positioned at the outlet of the forming device as defined in the invention.

The external protective sheath is preferably the outermost layer of the cable.

The external protective sheath is preferably an electrically insulating layer.

The external protective sheath is preferably made of a halogen-free material. It may be produced conventionally from materials that retard flame propagation or are resistant to flame propagation. In particular, if the latter do not contain halogen, it is called cladding of HFFR type (for "Halogen Free Flame Retardant").

The external protective sheath may comprise at least one organic or inorganic polymer.

The choice of the organic or inorganic polymer is not limiting, and they are well known to a person skilled in the art.

According to a preferred embodiment of the invention, the organic or inorganic polymer is selected from cross-linked and non-crosslinked polymers.

The organic or inorganic polymer may be a homopolymer or a copolymer having thermoplastic and/or elastomeric properties.

The inorganic polymers may be polyorganosiloxanes.

The organic polymers may be polyurethanes or polyolefins.

The polyolefins may be selected from the polymers of ethylene and propylene. Examples of ethylene polymers include linear low-density polyethylene (LLDPE), low-density polyethylene (LDPE), medium-density polyethylene (MDPE), high-density polyethylene (HDPE), ethylene/vinyl acetate copolymers (EVA), ethylene/butyl acrylate copolymers (EBA), ethylene/methyl acrylate copolymers (EMA), 2-hexylethyl acrylate (2HEA) copolymers, copolymers of ethylene and alpha-olefins such as for example polyethylene-octene (PEO), copolymers of ethylene and propylene (EPR), terpolymers of ethylene and propylene (EPT) such as for example the terpolymers of ethylene-propylene-diene monomer (EPDM) or a mixture thereof.

The polymer of the external protective sheath is preferably an organic polymer, more preferably an ethylene polymer, and more preferably an ethylene/vinyl acetate copolymer, a linear low-density polyethylene, or a mixture thereof.

The external protective sheath may further comprise a hydrated fireproofing mineral filler. This hydrated fireproofing mineral filler acts mainly physically by decomposing endothermically (e.g. release of water), which has the consequence of lowering the temperature of the sheath and limiting flame propagation along the cable. The cable is said to exhibit flame retardant properties.

The hydrated fireproofing mineral filler may be a metal hydroxide such as magnesium hydroxide or aluminium trihydroxide.

The external protective sheath may further comprise an inert filler, notably selected from talc, micas, dehydrated clays and a mixture thereof.

Advantageously, the cable obtained by a method according to the invention satisfies at least one of the standards for reaction or non-propagation in a fire, selected from the standards EN 60332-1, EN 60332-3, and EN 50399 (2012/02+A1 2016); and preferably the standard EN 50399 (2012/02+A1 2016), in particular the classification criteria B2ca, s1a, d0, a1 of said standard, and optionally the standards EN 60332-1 and EN 60332-3.

According to one embodiment of the invention, the cable is a power cable and/or a telecommunications cable, and preferably an electrical cable.

When the cable comprises a plurality of elongated electrically conducting elements, the composite layer may then surround the plurality of elongated electrically conducting elements of the cable.

The cable may comprise a single composite layer as defined in the invention or a plurality of composite layers as defined in the invention.

When the cable comprises a plurality of composite layers, the method may typically comprise the repetition of step iv), as many times as there are composite layers to be applied (with, where appropriate, identical or different rolls of tape for each of the layers produced), and then optionally step v) as defined in the invention.

The cable preferably comprises a single composite layer, and especially preferably a single inner composite layer, meaning that said composite layer does not form the outermost layer of the cable, this typically corresponding to the implementation of a single step iv) followed by a single step v).

Step iv) (or steps iv) when a plurality of successive steps are implemented) and step v) are preferably conducted continuously. According to this embodiment, there are no intermediate resting steps between the distribution of the non-woven fibrous material from the roll of impregnated and partially dried tape, and the recovery/production of the final cable.

When steps iv) and v) are conducted continuously, they are typically implemented concomitantly, by circulation of the impregnated and partially dried tape unwound from the roll on a production line, starting from the roll, and where each portion of the tape of fibrous material in circulation is first subjected at least once to step iv) in a first zone of the production line, then advantageously subjected to step v) in a second zone of the production line, to form a cable according to the invention.

According to one particular embodiment of the invention, the cable obtained according to the method of the invention further comprises one or more layers interposed between the elongated electrically conducting element and the composite layer as defined in the invention.

These layers may comprise one or more polymer layers such as electrically insulating polymer layers, and/or one or more metallic layers such as metallic layers containing one or more apertures.

In this case, the method further comprises, before step iv), one or more steps of application of one or more of the aforementioned layers around the elongated electrically conducting element, around the assembly of elongated electrically conducting elements, or around each of the elongated electrically conducting elements, depending on the type of cable desired.

The metallic layers containing one or more apertures are typically layers used in radiating cables that are well known to a person skilled in the art.

According to a preferred embodiment of the invention, the cable comprises:
a plurality of electrically conducting elements, each of said electrically conducting elements being surrounded by a polymer layer, notably electrically insulating, to form a plurality of insulated electrically conducting elements,
a composite layer as defined in the invention surrounding said plurality of insulated electrically conducting elements, and
an external protective sheath, notably electrically insulating, surrounding said composite layer.

The method according to the invention is rapid, simple and advantageous from an economic standpoint. It allows the manufacture, within a few steps, of a cable which exhibits good mechanical properties, especially in terms of flexibility and durability, while ensuring good fire resistance performance.

BRIEF DESCRIPTION OF THE DRAWINGS

The appended drawings illustrate one possible embodiment of the invention.

DETAILED DESCRIPTION

For clarity, only those elements essential to an understanding of the invention have been represented schematically in the figures, and they are not drawn to scale.

Figure 1:
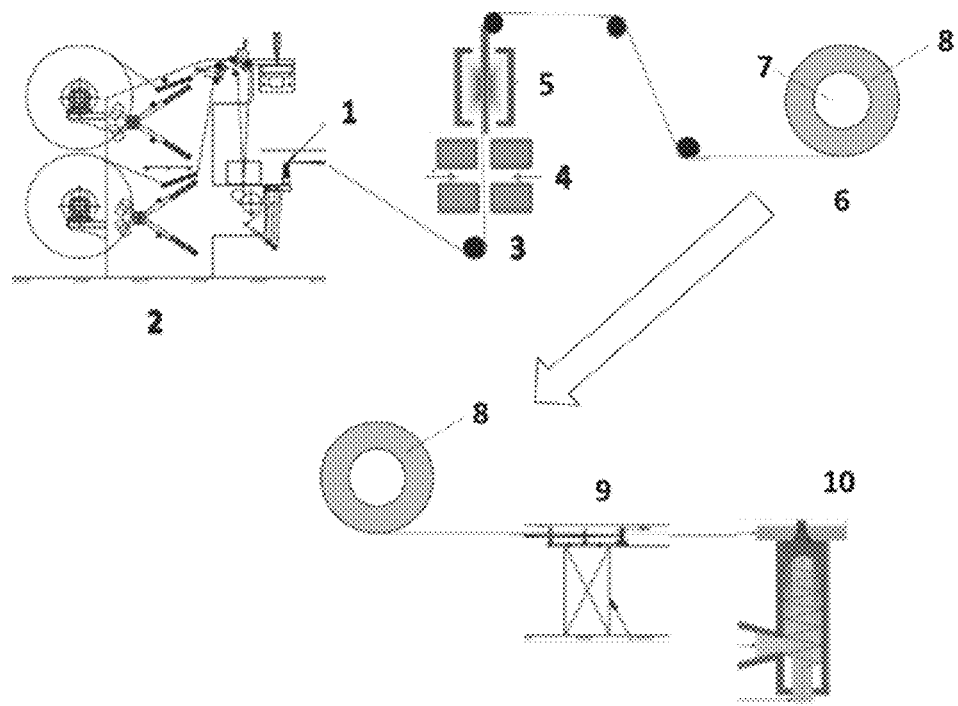
FIG. 1 represents a schematic view of a device implementing a method according to the invention.

FIG. 1 is a schematic illustration of a method according to the invention, corresponding to a continuous implementation of the steps of manufacture of the roll of impregnated and partially dried tape, followed by continuous implementation of the steps of manufacturing the cable from the roll.

FIG. 1 shows a non-woven fibrous material 1 in the form of a tape placed on a distributor 2, said material in tape form being unwound and brought from this distributor onto a continuous roll production line, which contains the following elements, through which the tape passes in succession: the moving tape first passes through a coating die 3 supplied with a geopolymer composition 4, to allow the material 1 to be impregnated with said composition 4 [according to step i) of the invention]. The coating die 3 is particularly connected to a pump, not shown in the drawing, which is advantageously combined with means for regulating the delivered flow of composition 4. The impregnated tape exiting the coating die 3 then passes through an oven 5 (or, more advantageously, a succession of ovens, in a scheme not shown in the figure), to enable it to be dried [according to step ii) of the invention]. The partially dried impregnated tape exiting the oven is then driven towards a winder 6 comprising a cylindrical axle 7 driven in rotation by a motor, not shown in the figure. The tape is wound in the direction of its length about the generatrix of this cylinder, to form an impregnated and partially dried roll 8 according to the invention, which is substantially cylindrical in shape, around the axle serving as the central core for the roll. The winding of the tape around the axle 7, moreover, is the basis of the overall movement impressed on the tape, which allows steps i), ii) and iii) to be implemented continuously by driving the tape from the distributor towards the winder.

The method may be conducted for impregnating and drying the entirety of the tape delivered by the distributor 2 and making it into a roll, or else, alternatively, for preparing at least one roll of impregnated and partially dried tape from only part of the tape delivered. When a roll of desired size has been obtained, it is typically removed from the winder (generally by cutting off the tape at the entry to the winder) and then advantageously packaged in a hermetic bag.

The arrow shown in FIG. 1 represents the storage and/or transfer of the resulting roll 8, typically to a site different from that which implements steps i) to iii).

The roll 8 is then used to produce a cable according to steps iv) and v) of the invention, which are conducted continuously.

To accomplish this, the partially dried impregnated tape is unreeled from the roll and then brought into a confining device 9 together with a cable comprising an elongated electrically conducting element which is parallel to the longitudinal axis of the tape and situated at the centre of the confining device. The confining device then causes the tape to fold over on itself in the direction of its width, so causing it to trap the cable over its length by thus forming a composite layer surrounding said elongated electrically conducting element [according to step iv)]. The cable thus obtained passes through an extrusion head 10 to form an external protective sheath [according to step v)].

Figure 2:
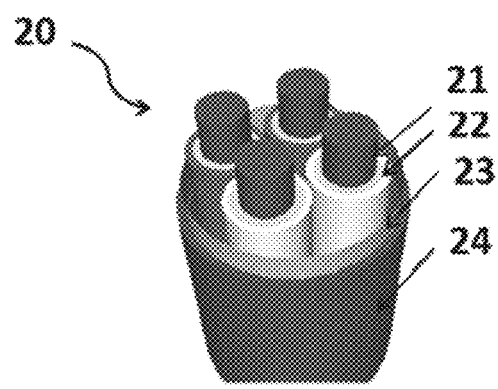
FIG. 2 represents a schematic view of an electrical cable as may be obtained by the method according to the invention.

FIG. 2 is a schematic representation of an electrical cable 10, corresponding to a fire-resistant electrical cable of type K25 or RZ1K.

This electrical cable 20 comprises four elongated electrically conducting elements 21, each of which is insulated with an electrically insulating layer 22, and, in succession and coaxially around these four insulated, elongated electrically conducting elements, a composite layer 23 as defined in the invention surrounding the four insulated, elongated electrically conducting elements, and an external HFFR sheath 24 surrounding the composite layer 23 as defined in the invention, and is advantageously in the form of a tape.

The examples below, which are carried out on production lines corresponding to those illustrated in FIG. 1, illustrate one possible embodiment of the present invention.

EXAMPLES

The starting materials used in the examples are listed below:
about 50% by weight aqueous solution of a first sodium silicate of "waterglass" type, Simalco, sodium silicate with an $SiO_2/Na_2O$ molar ratio of about 2.0,
about 38% by weight aqueous solution of a second sodium silicate of "waterglass" type, Simalco, sodium silicate with an $SiO_2/Na_2O$ molar ratio of about 3.4,
first metakaolin, PoleStar® 450, Imerys, with an $Al_2O_3/SiO_2$ molar ratio of 41/55 (i.e. about 0.745), kaolin calcined at a temperature of about 1000° C.,
second metakaolin, PoleStar® 200R, Imerys, with an $Al_2O_3/SiO_2$ molar ratio of 41/55 (i.e. about 0.745), kaolin calcined at a temperature of about 700° C., and non-woven polyester material, GT320, GECA TAPES.

Unless indicated otherwise, all of these starting materials were used as received from the manufacturers.

Example 1

Preparation of a Roll of Impregnated Tape According to the Invention

A geopolymer composition was used in this example, having been prepared as follows: an aqueous solution of alkali metal silicates was prepared by mixing 40 g of a 50% by weight aqueous solution of a first sodium silicate and 40 g of a 38% by weight aqueous solution of a second sodium silicate. Then 10 g of a first metakaolin and 10 g of a second metakaolin were mixed with the aqueous solution of alkali metal silicates. The geopolymer composition comprises about 55.2% by weight of solids, relative to the total weight of said geopolymer composition.

The composition was used under the following conditions:

A non-woven fibrous polyester material in the form of a tape (width: 40 mm; thickness: 450 μm; length: 650 m) is continuously unreeled from a distributor, at a rate of about 50 m/min; the tape passes through a production line as illustrated in FIG. 1, and first passes through a coating die which is fed with said geopolymer composition using a pump delivering a constant flow rate of 1.5 kg/min, allowing the non-woven fibrous material to be impregnated with the geopolymer composition. The geopolymer composition has a temperature of about 40° C.

The impregnated tape then passes through three successive ovens in series: a first IR oven operating at a temperature of 800° C., then through a second IR oven likewise operating at a temperature of 800° C. and connected directly to the first, and finally again through a third IR oven also operating at a temperature of 800° C., and connected directly to the second oven, hence allowing the impregnated tape to be dried.

At the end of the production line, the impregnated and partially dried tape is wound on itself in the direction of the length to form a substantially cylindrical roll, with a height, according to the generatrix, equal to the thickness of the tape. Winding is carried out by winding the tape around a cylindrical cardboard carrier.

The resulting roll is packaged in a clean hermetic bag for long-term storage, or even for transport over long distances.

Example 2

Preparation of a Fire-Resistant Cable According to the Invention

The roll of partially dried impregnated tape obtained in Example 1 was used as the tape source in this example, under the conditions below.

The impregnated and partially dried tape, unreeled from the roll, was brought into a confining device, through which a low-voltage cable is run, the longitudinal axes of the cable and of the tape being parallel, thereby causing the impregnated tape to be wound around the cable, with the tape becoming wound in the direction of the length and coming to envelop the cable. The cable comprises five copper conductors with a section of 1.5 mm$^2$, each of the conductors being surrounded with an electrically insulating layer based on XLPE. At the end of the step of applying the impregnated tape around the cable, a composite layer is obtained which surrounds the insulated conductors.

The composite layer thus formed has a thickness of 0.5 mm.

The assembly obtained is then covered by hot extrusion with a protective polymer sheath based on an HFFR mixture produced by NEXANS, based on polyethylene and fireproofing fillers, said sheath having a thickness of about 2 mm. In this way a cable according to the invention has been obtained. The flame performance of the cable is determined in accordance with the standard EN50399. 15 sections of cable positioned on a vertical ladder are exposed to a flame with a power of 20 kW for 20 min.

The results are reported in Table 1 below:

TABLE 1

| Performance parameters | Values | EN50399 Class |
|---|---|---|
| pHRR (kW) | 13.8 | B2 |
| Time at peak HRR (s) | 912 | |
| THR (MJ) | 5.2 | |
| FIGRA (w/s) | 23.6 | |
| Flame propagation (m) | 0.56 | |
| Flaming droplets | None | d0 |
| SPR (m$^2$/s) | 0.03 | s1 |
| Time at peak SPR (s) | 876 | |
| TSP (m$^2$) | 28.12 | |

In this table, the acronym HRR corresponds to the expression "Heat Release Rate" providing information on the heat flow; the acronym THR corresponds to the expression "Total Heat Release", providing information on the amount of heat released during combustion; the acronym FIGRA corresponds to the expression "Fire GRowth rAte", providing information on the rate of growth of the fire; the acronym SPR corresponds to the expression "Smoke Production Rate", providing information on the rate of production of smoke, and the acronym TSP corresponds to the expression "Total Smoke Production", providing information on the total amount of smoke produced.

These results demonstrate that the cable according to the invention exhibits maximum fire protection properties with respect to the requirements of European Standard EN50399.

The invention claimed is:

1. A method for manufacturing a cable having at least one elongated electrically conducting element and at least one composite layer surrounding said elongated electrically conducting element, said method comprising the steps of:
   forming the composite layer surrounding said elongated electrically conducting element by applying a tape of fibrous material impregnated with a geopolymer composition around said cable, and wherein said tape, impregnated and dried, is delivered from a roll prepared according to steps as follows:
   i) impregnating a non-woven fibrous material with a geopolymer composition, to forma tape impregnated with said geopolymer composition,
   ii) heat-treating the impregnated tape obtained in step i), to form an impregnated and partially dried tape, and
   iii) forming the roll by winding the impregnated and partially dried tape from step ii) on itself.

2. The method according to claim 1, wherein the non-woven fibrous material is selected from cellulosic materials, materials based on synthetic organic polymers, glass fibres, and a mixture thereof.

3. The method according to claim 1, wherein the non-woven fibrous material is selected from materials based on synthetic organic polymers, said materials based on synthetic organic polymers being selected from polymeric materials having a porous and/or fibrous matrix of polyolefin(s), more particularly those selected from propylene homo- and copolymers, ethylene homo- and copolymers, high-density polyethylenes (HDPE), aromatic polyamides (aramids), polyesters, and a mixture thereof.

4. The method according to claim 1, wherein the non-woven fibrous material is a polyethylene terephthalate.

5. The method according to claim 1, wherein the non-woven fibrous material has a basis weight of from 50 to 120 g/cm2.

6. The method according to claim 1, wherein the geopolymer composition is an aluminosilicate geopolymer composition.

7. The method according to claim 1, wherein the geopolymer composition comprises water, silicon (Si), aluminium (Al), oxygen (O), and at least one element selected from potassium (K), sodium (Na), lithium (Li), caesium (Cs), and calcium (Ca).

8. The method according to claim 1, wherein step ii) is carried out at a temperature of at most 120° C.

9. The method according to claim 1, wherein step ii) is carried out at a temperature of at least 50° C.

10. The method according to claim 1, wherein the partially dried impregnated tape is applied around the cable comprising at least one elongated electrically conducting element by winding the partially dried impregnated tape around the cable along the longitudinal axis of the cable.

11. The method according to claim 1, wherein the partially dried impregnated tape is applied around the cable comprising at least one elongated electrically conducting element by winding the partially dried impregnated tape around the cable by helicoidal winding.

12. The method according to claim 1, wherein the geopolymer composition comprises water, silicon (Si), aluminum (Al), oxygen (O), and at least one element selected from potassium (K) and sodium (Na).

13. The method according to claim 1, wherein step i) is implemented by passing the non-woven fibrous material through a coating device supplied with the geopolymer composition, using a supply means.

14. The method according to claim 13, wherein the supply means is equipped with means for regulating the rate of supply.

15. The method according to claim 1, wherein the roll of impregnated and partially dried tape is wound on itself about an axis perpendicular to its longitudinal axis.

16. The method according to claim 15, wherein the impregnated and partially dried tape is circumposed on itself around a carrier of the roll, said roll being in the form of an assembly comprising the carrier.

17. The method according to claim 1, wherein the non-woven fibrous material represents from 2% to 95% by weight relative to the total weight of the composite layer.

18. The method according to claim 17, wherein the non-woven fibrous material represents from 5% to 45% by weight, relative to the total weight of the composite layer.

19. The method according to claim 18, wherein the non-woven fibrous material represents from 10% to 35% by weight, relative to the total weight of the composite layer.

* * * * *